April 20, 1948. I. E. WIEGERS 2,440,034
REGULATING DEVICE
Filed March 3, 1945
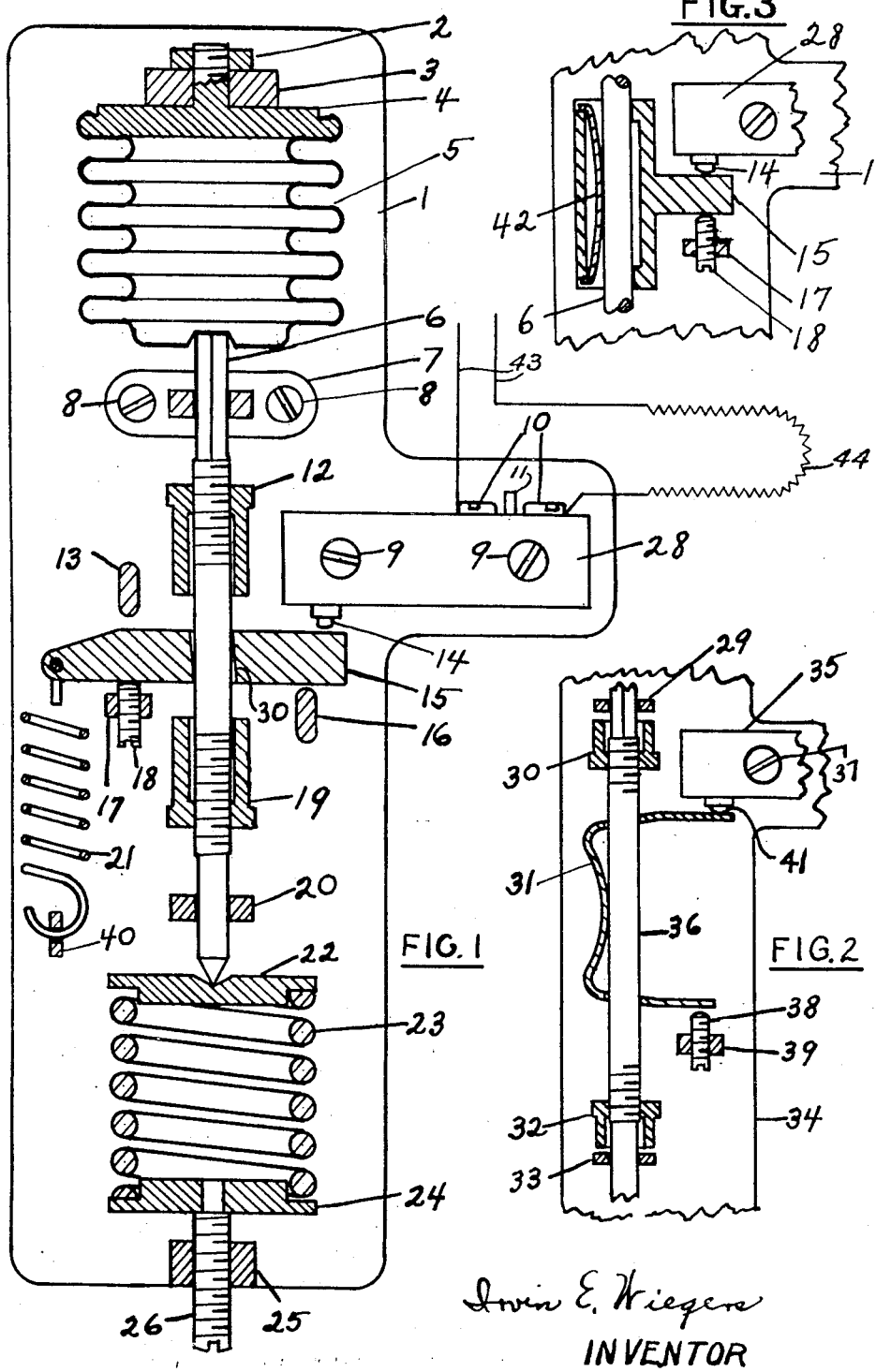
Irvin E. Wiegers
INVENTOR Patented Apr. 20, 1948

2,440,034

UNITED STATES PATENT OFFICE 2,440,034

REGULATING DEVICE

Irvin E. Wiegers, Overland, Mo.

Application March 3, 1945, Serial No. 580,905

7 Claims. (Cl. 200—140)

This invention relates to new and useful improvements in regulating devices for temperature, pressure and other controllable quantities. Its object is to provide a control which will be responsive to a change in the direction of the temperature or pressure movements; that is, it responds when a falling temperature begins to rise or a rising temperature begins to fall, and further to provide a control which will tend to restore the desired temperature or pressure regardless of a change in direction when the temperature or pressure lies outside of certain limits.

With the above and other objects in view which will appear as the description proceeds, this invention resides in the novel construction, combination and arrangement of parts as defined by the appended claims, it being understood that changes in the precise embodiment of the herein disclosed invention may be made as come within the scope of the claims.

The accompanying drawing illustrates simple and practical mechanical methods of obtaining embodiments of my invention. It will be apparent to skilled persons that hydraulic, pneumatic and electrical methods could be employed.

The accompanying drawing illustrates methods for constructing the invention. Figure 1 is a view in vertical section showing a complete temperature control device. Figure 2 is a similar fragmentary view showing a variation of the invention. Figure 3 is a fragmentary view showing a modified form of mounting for the actuator.

The embodiment illustrated in Figure 1 is intended for use in controlling temperature, though it may also be used with simple modifications to control pressure, such as hydraulic or pneumatic pressure. Referring to the drawing, 1 designates a base or support upon which the apparatus is mounted. Supported in a suitable bracket 3 on the base 1 and secured thereto by means of a nut 2 is a mechanism 5 arranged to cause movement in response to variations in the quantity to be controlled. In the illustrated embodiment the device 5 takes the form of a bellows expansible vertically under internal pressure. This may be charged with a volatile liquid or expansible gas adapted to cause the bellows to expand and contract with changes in temperature in a well-known manner. A movable member in the form of a bar 6 is mounted in suitable guides 7 and 20 on the base 1 and abuts at its upper end against the end of the bellows 5. The lower end of the bar 6 is resiliently supported by any suitable form of return mechanism. In the drawing a spring 23 rests on a plate 24 which in turn is adjustably supported on a screw 26 engaging a threaded bracket 25 on the base 1. The spring 23 carries a plate 22 engaging the lower end of the bar 6. By this arrangement the bar is resiliently forced upward against the bellows 5. Accordingly changes in the quantity to be regulated, in this case temperature or pressure, will cause the bellows 5 to move the bar 6. This movement will be downwardly against the force of the spring 23 upon increase of such temperature or pressure and the spring will move the bar in the opposite direction upon decrease of these quantities. Thus the bar 6 provides a member which is movable in response to variations in the quantity to be controlled.

An actuating element in the form of a slide bar 15 is arranged transversely of the bar 6 and is provided with a perforation 30 traversing its middle portion. The bar 6 is arranged to pass through the perforation 30 with sufficient clearance to permit the bar 6 to slide freely through the actuator 15. One end of the element 15 is engaged by a tension spring 21 anchored to a suitable bracket 40 on the base 1. This spring is adapted to tilt or cock the element 15 relatively to the bar 6 so as to cause the sides of the perforation 30 to grip said bar. This provides a clutching device whereby the element 15 may be releaseably clutched to the bar 16 to be carried by the bar in its movement in response to the temperature or pressure variations. A control device 28 of any suitable type is mounted by means of screws 9 on the base 1. In the embodiment illustrated the device 28 is in the form of a microswitch provided with terminal binding screws 10, controlling an electrical heating element 44 supplied by power lines 43. The heating element 44 causes temperature variations affecting the bellows 5. The device 28 could also be a steam or refrigerant valve or a device of any type controlling any phenomenon. The device 28 has an actuating button 14 positioned in the path of movement of the element 15 when the latter is carried upwardly by the bar 6 so that said bar may actuate the button 14 at a suitable point in its travel.

The control device 28 is positioned so that the button 14 engages the element 15 on the opposite side of the bar 6 from the point where the spring 21 is connected. Accordingly as the element 15 moves upwardly the end engaging the button 14 will eventually be arrested thereby so that further travel of the bar 6 will cause the element 15 to tip with respect thereto, counteracting the effect of the spring 21 and causing a change in the relative alignment of the perforation 30 and the bar 6 so as to release the gripping action and permit the bar 6 to slide relatively to the element 15. After such engagement between the element 15 and the button 14 has taken place the bar 6 may continue to slide upwardly through the perforation 30 until the effect of the action of the control means 28 causes the bellows to cease contracting and to begin to expand. Such expansion will reverse the movement of the bar 6 causing it to move downwardly in Figure 1. This movement permits the left hand end of the element 15, as shown in Figure 1, to be moved downwardly by the spring 21 so as to again cock the element 15 with respect to the bar 6, thereby causing reengagement of the grip provided by the perforation 30. It will be seen therefore that this reengagement will take place immediately upon reversal of movement of the bar 6.

Means are provided to produce a similar action during the descending movement of the bar 6. An adjustable stop provided by a screw 18 engaging a threaded bracket 17 on the base 1 is arranged to engage the left hand end of the element 15 in Figure 1 as the latter is carried downwardly by the bar 6. Here again as the element 15 moves downwardly after engaging the stop 18, it is tipped about said stop as a pivot, thereby counteracting the action of the spring 21 and causing the bar 6 to slide through the perforation in the manner already described. During the downward movement also the sliding of the bar 6 through the element 15 causes the latter to be positioned in a new relation to the former and immediately upon reversal of movement of the bar 6 the clutching action at the perforation 30 again comes into play and the element 15 is immediately carried up with the bar 6. The force of the spring 21 should be a minimum, just great enough to operate control device 28.

It will be seen that the action just described is such as to permit movement of the bar 6 in both directions beyond the limits of movement of the actuator 15 and that the actuator is reset in a new position on the bar 6 after reversal of the movement.

When the temperature at the bellows 5 reaches a certain fixed value determined by the position of the stop 12 on the bar 6 and the setting of the adjustment screw 26, the stop 12 will engage the actuator 15 and force it against the rests 18 and 16. If the temperature continues to rise there will be no further movement of the rod 6 or the actuator 15. Consequently when a temperature reversal occurs at some value above this temperature, the switch 28 is not actuated and no heat will be supplied until the temperature falls to approximately the point at which the stop 12 engaged the actuator 15. Thus the device tends to restore the desired temperature regardless of a reversal in trend when the temperature lies above the desired value. In a similar manner when the temperature at the bellows 5 falls below a certain value, the stop 19 will force the actuator against the rest 13 and the button 14 and hold it there regardless of a reversal in the temperature trend until the temperature rises to approximately the point at which the stop 19 engaged the actuator 15.

In an actual application the device was found to operate as follows: Starting with the temperature at the bellows 5 well below the temperature for which the device was set, the stop 19 held the actuator 15 against the rest 13 and the button 14, thus putting the heat producing equipment in operation. Upon reaching a temperature near the desired point the actuator 15 moved away from the rest 13 and the button 14, thus putting the heat producing equipment out of operation. Due to the "heat inertia" of the system the temperature continued to rise and the actuator 15 moved into contact with the rest 18 causing it to release its grip on the rod 6. As the temperature continued to rise the rod 6 continued to travel. The stop 19 moved out of contact with the actuator 15. After some time the temperature began to fall due to heat loss and the rod 6 reversed its direction, engaged the actuator 15 and moved it into contact with the button 14 again starting the heat producing equipment. Shortly thereafter the temperature again began to rise moving the actuator 15 out of contact with the button 14 and stopping the heat producing equipment. The rise again continued and the actuator 15 moved into contact with the rest 18 and the rod 6 continued its travel, independent of the actuator 15. When the temperature again began to fall the actuator 15 was positioned at a new point on the rod 6. This action continued until the stop 12 moved into contact with the actuator 15. When this occurred rests 18 and 16 and the stop 12 prevented further travel of the rod 6 and the heat producing equipment was not turned on immediately upon a drop in temperature but was kept off until the temperature fell to approximately the point at which the stop 12 had engaged the actuator 15. The heat producing equipment was then turned on but the fall in temperature did not immediately cease and the stop 12 moved out of contact with the actuator 15. As soon as the temperature began to rise, however, the actuator 15 gripped the rod 6 and moved out of contact with the button 14, stopping the heat producing equipment. The temperature continued to rise and the stop 12 moved back into contact with the actuator 15 and the device continued repeating the last described cycle without variation.

It is apparent from this description that the performance of this device will vary somewhat with each system to which it is applied. It can be generally stated, however, that when properly applied and adjusted it will tend to restore and maintain a desired temperature with a minimum of "hunting" or "cycling" because of "anticipatory" qualities not found in the conventional type of control.

Some of the shortcomings of the conventional methods of temperature control are described in section 176, beginning on page 222 of the fourth edition of "Heating and Air Conditioning," by Allen and Walker, published by McGraw-Hill Book Co., Inc., and entitled "Difficulties in automatic control."

In the arrangement shown in Figure 2 the actuator 31 is in the form of a generally U-shaped spring, having two perforations through which the bar 36 passes and arranged to bear against said bar at the middle portion of the U. The spring action of this portion forces the bar against the opposite sides of the two perforations and thus provides a clutching action similar to that described for the actuator 15. In this case the button 41 of the control device 35 and the stop 38 engage different legs of the U but their action again is to counteract the spring tension in such a manner as to release the grip of the actuator on the bar 36. In this case the adjustable stops 30 and 32 may be arranged to engage the guide brackets 29 and 33 instead of engaging the actuator in order to arrest the movement of the bar 36 at predetermined points. The action, however, is the same as described for Figure 1.

In the arrangement illustrated in Figure 3 the actuator 15 is carried by the bar 6 by a simple frictional contact. The actuator 15 is loosely fitted to the bar 6 with a leaf spring 42 holding it in intimate frictional contact. The leaf spring 42 is adjusted so that actuator 15 is dependably able to operate the micro-switch 28 but its force should be no greater than necessary to perform this function. When the actuator is arrested by the micro-switch 28 or by the stop 18 the bar 6 is still relatively free to travel but upon reversal of its movement the actuator will be carried with it.

It will be understood, of course, that the physical form of the device may vary in accordance with the requirements of different quantities to be controlled without departing from the spirit of the invention. The movable member 6 may be operated by variation in temperature, hydraulic or pneumatic pressures, liquid level, magnetic intensities or practically any quantity which may be arranged to produce movement in accordance with its variations. It will be understood also that while in the illustrated embodiment member 6 moves rectilinearly, it may be arranged to move in any other form of path with corresponding modifications in the other members to accommodate such movement. The control device 28 in other applications of the invention might be a rheostat, valve, damper or other control means.

It is understood, therefore, that various modifications may be made within the scope of the appended claims without departing from the spirit of the invention and that the claims are not limited to the specific construction shown and described.

Having thus described the invention, what is claimed is:

1. A regulating device of the character described, comprising, a member movable in response to variations in the quantity to be regulated, control means for varying the quantity to be regulated, an element for operating said control means moved by said member by means of a slip friction connection, and means limiting the range of movement of said member.

2. A regulating device of the character described, comprising, a member movable in correspondence to variations in the quantity to be regulated, means for limiting the motion of said member without destroying such correspondence in its movement, control means for varying the quantity to be regulated, and means variably connectable with said member for actuation thereby to cause operation of said control means, said last named means operating automatically to cause such connection upon change in the direction of variation of the quantity to be controlled.

3. Regulating means of the character described, comprising, a member movable in accordance with variations in the quantity to be regulated, control means for varying the quantity to be regulated, means operable upon reversal of movement of said member to actuate said control means, and means to delay the operation of said actuating means for a predetermined period after such reversal.

4. Regulating means of the character described, comprising, a member movable in accordance with variations in the quantity to be regulated, control means for varying the quantity to be regulated, means operable upon reversal of movement of said member to actuate said control means, and means adjustable to limit the movement of said member to a predetermined range of the quantity to be regulated.

5. Regulating means of the character described, comprising, a member actuated to move in definite relation to variation in the quantity to be regulated, control means for varying the quantity to be regulated, means operable upon reversal of movement of said member to actuate said control means, and means for arresting the movement of said member at a predetermined position.

6. A regulating device of the character described, comprising, a member movable in correspondence to variations in the quantity to be regulated, control means for varying the quantity to be regulated, an actuator for said control means having a slip-clutch normally biased to connect said actuator with said member, means for breaking the slip-clutch connection so made at a predetermined position and direction of movement of said member, and stop means adapted to arrest the movement of said member.

7. A regulating device of the character described, comprising, a member movable in response to variations in the quantity to be regulated; control means for varying the quantity to be regulated; an element for operating said control means upon reversals in the trend of the quantity to be regulated and means preventing operation of said control means when the value of the quantity to be regulated lies outside predetermined limits.

IRVIN E. WIEGERS.

REFERENCES CITED

The following references are of record in the file of this patent:

UNITED STATES PATENTS

| Number | Name | Date |
| --- | --- | --- |
| 2,257,439 | Wilson | Sept. 30, 1941 |